Patented Apr. 10, 1934

1,953,971

UNITED STATES PATENT OFFICE 1,953,971

LAMINATED GLASS AND METHOD OF MAKING THE SAME

William Henry Moss, Cumberland, Md., assignor to Celanese Corporation of America, a corporation of Delaware No Drawing. Application October 20, 1928, Serial No. 313,963

5 Claims. (Cl. 49—81)

This invention relates to the preparation of laminated glass and relates more particularly to the use of a special adhesive for causing sheets of celluloid-like material to adhere to glass.

Another object of my invention is to prepare laminated glass that is shatterless and whose component parts are well stuck.

Another object of my invention is to use as an adhesive for causing the celluloid sheet to adhere to the glass, a coating composition containing a synthetic resin of the alkyl toluene sulfonamid-aldehyde type. Other objects of my invention will appear from the following detailed description.

The adhesive coatings that have been heretofore proposed for use in causing sheets containing cellulose nitrate to adhere to glass are not suitable for use in making laminated glass that contains a plastic sheet containing organic derivatives of cellulose. I have found, however, that very suitable adhesives for causing plastic sheets of organic derivatives of cellulose to adhere to glass may be prepared by dissolving alkyl toluene sulfonamid-aldehyde resins compatible with organic derivatives of cellulose in a suitable solvent.

In accordance with my invention I prepare well stuck laminated glass by interposing one or more sheets of a plastic composition containing a derivative of cellulose between two or more sheets of glass, the sheets of the plastic composition or of the glass or both having been previously coated with a coating composition containing an alkyl toluene sulfonamid resin that is compatible with the derivative of cellulose. The assembled sheets are then pressed at elevated temperature to cause adhesion between the component parts to produce a well stuck shatterless laminated glass with substantially no letgoes.

The glass employed may be any suitable blown, plate or any other glass that is appropriate for use in automobile windshields or windows, railroad car windows, or in other places where a shatterless laminated glass is to be employed.

In one form of my invention, the laminated glass is prepared by interposing a celluloid sheet made of a plastic composition containing derivatives of cellulose between sheets of glass. While cellulose nitrate may be employed in making the plastic sheet, I also employ sheets containing organic derivatives of cellulose with great advantage. These organic derivatives of cellulose may be esters of cellulose such as cellulose acetate, cellulose formate, cellulose propionate or cellulose butyrate, or cellulose ethers such as ethyl cellulose, methyl cellulose or benzyl cellulose. These sheets may contain appropriate plastifiers such as camphor, triacetin, diethyl tartrate, dibutyl tartrate, diethyl phthalate, etc., and also if desired, pigments and/or dyes, particularly those of a violet tint opposed to yellowness. If desired, stabilizers such as urea may also be added to the derivatives of cellulose. In the selection of ingredients, it is of importance to select such combination that the whole is substantially light-fast.

In another form of my invention a sheet of celluloid-like material need not to be employed as such, but may be built up on the glass to be laminated as will be described below.

The adhesive to be employed for the lamination process is a coating composition containing a synthetic resin formed by the condensation of an alkyl toluene sulfonamid with an aldehyde. Examples of such alkyl toluene sulfonamids are methyl para-toluene sulfonamid and ethyl para-toluene sulfonamid. Examples of aldehydes are formaldehyde, paraformaldehyde and acetaldehyde. The alkyl toluene sulfonamide resin may be made in any suitable manner. I prefer to employ an ethyl toluene sulfonamid resin prepared by heating under reflux at 140° to 150° C. for 12 hours, equimolecular proportions of ethyl para-toluene sulfonamid and formaldehyde in the presence of a suitable catalyst, such as 2 or 3% by weight of hydrochloric acid. The clear, light yellow resinous mass that is produced is then freed from excess of reactants by washing with water, by distillation, or in any other convenient manner.

The coating composition containing the synthetic resin preferably should contain any of the derivatives of cellulose mentioned above, and also may contain other resins, natural or synthetic, suitable plastifiers or softening agents, dyes or stabilizers above described. If a derivative of cellulose is used in the adhesive coating composition, it may preferably be of low viscosity characteristics.

While ordinary cellulose derivatives may be used in making either the celluloid sheets or the coating compositions to be used as an adhesive, I have found that much better results from the point of view of light-fastness may be obtained by employing specially purified derivatives of cellulose. The derivative of cellulose such as cellulose acetate may be purified by careful and thorough filtrations of solutions of the same as described in application #313,966 filed on even date herewith, or by treatment of the same either in solid form or in solution with oxidizing agents such as nitric acid or hydrogen peroxide as described in application #313,968 filed on even date herewith.

In order further to illustrate my invention but without being limited thereto, a few specific examples of suitable coating compositions for use as an adhesive in making laminated glass are now given.

The following is an example of a coating composition containing the resin as the sole solid constituent.

Parts by weight
Ethyl toluene sulfonamid-formaldehyde resin_ 10
Benzene _____ 20

If desired the benzene may be replaced by acetone.

Plastifiers may be added to the coating composition, and the following are examples of this Parts by weight
(a) Ethyl toluene sulfonamid resin_____ 10
 Mono-methyl-xylene sulfonamid_____ 4
 Acetone _____ 20
(b) Ethyl toluene sulfonamid resin_____ 10
 Ethyl toluene sulfonamid_____ 5
 Acetone _____ 20

Other synthetic resins may be added to the coating composition and the following are examples of this.

Parts by weight
(a) Ethyl toluene sulfonamid resin_____ 10
 Toluene sulfonamid-formaldehyde resin_ 10
 Acetone _____ 20
(b) Ethyl toluene sulfonamid resin_____ 8
 Toluene sulfonamid-formaldehyde resin_ 12
 Acetone_____ 50
 Alcohol_____ 25
 Benzene_____ 25
 Ethyl lactate_____ 5

An example of a coating composition containing a derivative of cellulose is

Parts by weight
Cellulose acetate_____ 10
Ethyl toluene sulfonamid resin_____ 10
Acetone_____ 100

The following is an example of an adhesive coating composition containing cellulose nitrate:

Parts
Cellulose nitrate_____ 11
Camphor _____ 4
Ethyl toluene sulfonamid resin_____ 15
Benzene _____ 40
Ethyl alcohol_____ 20
Butyl alcohol_____ 40
Butyl acetate_____ 40
Ethyl acetate_____ 60

It may be stated that an adhesive containing cellulose nitrate and the resin is preferred when plastic sheets containing cellulose nitrate are to be laminated.

In applying the adhesive coating composition in accordance with my invention, the same may be spread by flowing, spraying, dipping or brushing as desired. While the usual practice is to apply the adhesive to the surfaces of the glass and not to the plastic sheet containing the derivative of cellulose such as cellulose acetate, if desired, the adhesive may be applied to the surfaces of the cellulose derivative sheet also. Sometimes it is preferable to apply two or more coats of the coating composition on the glass or plastic sheet, which coats may be of the same composition or of different composition. It is at times advisable first to apply a coat of coating composition having a larger proportion of synthetic resin and then to apply coats of adhesive containing less resin and more derivative of cellulose and/or plastifier.

When a plastic sheet or derivative of cellulose is used in making the laminated glass, after a suitable quantity of adhesive has been applied to surfaces, the plastic sheet is inserted between the sheets of glass, and the same is pressed in a suitable press at elevated temperature. The temperature and pressure that are employed may be varied considerably in accordance with the properties of the coating composition and the plastic sheets.

It is also within the scope of this invention to dispense with the use of plastic sheet in making the laminated glass. In this modification, a film or sheet is built upon the sheets of glass to be laminated by applying the coating composition herein described, until a layer of sufficient thickness is formed. As a variation, the glass may be coated with the adhesive coating composition herein described and then further coats of a coating composition containing derivatives of cellulose but no resin are applied until a film or sheet of sufficient thickness for lamination is formed.

The adhesive coating composition after it is applied may be dried by gentle heat, say for instance 50 to 100° C. for 15 to 60 minutes or by longer drying at ordinary temperature.

The laminated glass made in accordance with this invention is well stuck, free of letgoes, and when struck by a sharp blow, the pieces of the broken glass adhere firmly to the cellulose derivative sheet. Moreover, the laminated glass is light-fast and does not discolor appreciably when exposed to ultra violet light for a long time.

It is to be understood that the foregoing detailed description is given merely by way of illustration and that many variations may be made therein without departing from the spirit of this invention.

Having described my invention what I claim and desire to secure by Letters Patent is:

1. The method of making laminated glass comprising coating the surface of at least one of the components of glass and a plastic sheet containing cellulose acetate with an adhesive coating composition containing an ethyl toluene sulfonamid-formaldehyde resin that is resistant to blooming and cellulose acetate interposing the plastic sheet between sheets of glass and then pressing at suitable temperatures.

2. Laminated glass having at least one layer of a plastic sheet containing cellulose acetate interposed between sheets of glass and having a film containing an ethyl toluene sulfonamid-formaldehyde resin to cause adhesion between the plastic sheet and the glass, said resin being resistant to blooming.

3. Laminated glass having at least one layer of a plastic sheet containing cellulose acetate interposed between sheets of glass and having a film containing an ethyl toluene sulfonamid-formaldehyde resin and cellulose acetate to cause adhesion between the plastic sheet and the glass, said resin being resistant to blooming.

4. In the method of laminating articles, the step of applying a coating composition containing a soluble and fusible ethyl toluene-sulfonamide formaldehyde resin that is resistant to blooming and cellulose acetate as an adhesive.

5. In the method of making laminated glass, the step of applying a coating composition containing a soluble and fusible ethyl toluene-sulfonamide formaldehyde resin that is resistant to blooming and cellulose acetate as an adhesive.

WILLIAM HENRY MOSS.